US006519985B2

(12) United States Patent
Grant

(10) Patent No.: US 6,519,985 B2
(45) Date of Patent: Feb. 18, 2003

(54) STERN DRIVE AND OUTBOARD LOCKS

(76) Inventor: Christopher J. Grant, 21020 Lawson Ave., Port Charlotte, FL (US) 33952

( * ) Notice: Subject to any disclaimer, the term of this patent is extended or adjusted under 35 U.S.C. 154(b) by 145 days.

(21) Appl. No.: 09/798,107

(22) Filed: Mar. 2, 2001

(65) Prior Publication Data

US 2002/0012577 A1 Jan. 31, 2002

Related U.S. Application Data

(63) Continuation-in-part of application No. 09/626,220, filed on Jul. 26, 2000, now Pat. No. 6,176,661.
(60) Provisional application No. 60/155,576, filed on Sep. 24, 1999.

(51) Int. Cl.[7] ........................................ F16B 41/00
(52) U.S. Cl. ........................ 70/232; 70/229; 70/230; 70/231; 70/258; 70/259; 70/DIG. 57
(58) Field of Search ..................... 70/229, 230, 231, 70/232, DIG. 57, 258, 259

(56) References Cited

U.S. PATENT DOCUMENTS 1,530,521 A * 3/1925 Robinson ................. 224/42.25
1,796,517 A * 3/1931 Ganz ........................... 70/231
1,818,373 A * 8/1931 Beach .......................... 70/232
1,828,658 A * 10/1931 Henke, Jr. ..................... 70/18
1,877,545 A * 9/1932 Wise ........................... 70/231
4,548,061 A * 10/1985 Nilsson ....................... 70/232
4,862,716 A * 9/1989 Derman ....................... 70/166
5,630,687 A * 5/1997 Robinson ................. 411/372.6

* cited by examiner

*Primary Examiner*—Anthony Knight
*Assistant Examiner*—Christopher Boswell

(57) ABSTRACT

The present invention is a locking device for securing outboard motors and stern drives mounted on a plurality of exposed studs on the stern of a boat, and construction equipment on a plurality of studs inset in concrete or other media and other items which can be mounted. The invention is comprised of a 304 work hardened stainless steel body which has two blind holes connected by a slot. In one blind hole, a keyed lock assembly is fitted. The keyed lock deploys a catch which engages a groove in a stainless steel lock pin. The lock pin can be attached to items having protruding studs or other protuberances.

1 Claim, 14 Drawing Sheets

STERN DRIVE AND OUTBOARD LOCKS

RELATED APPLICATIONS

This application is a Continuation-In-Pant of Provisional Application Serial No. 60/155,576 Filed Sep. 24, 1999 and U.S. Pat. No. 6,176,661 B1 issued Jan. 23, 2001 and a Continuation-In-Part of non-provisional patent application 09/626,220 filed Jul. 26$^{th}$ 2000.

BACKGROUND OF THE INVENTION

1. Field of the Invention

This invention relates generally to locking devices and more particularly to a locking system for securing outboard motors, stem drives, construction equipment, building equipment, trucking equipment, trailers, motor cycles, personal water craft, or commercial and residential premises against theft or intrusion.

2. Description of the Prior Art

Traditionally and historically, padlocks with a sliding staple have been used to secure every imaginable item of property its owner considered valuable. The ubiquitous padlock is so familiar that its profile alone has come to signify the term "lock" as a symbol. Padlocks are made in uncountable variations, sizes, styles and materials and to an extent, represent the 'state-of-the-art'. Common as they are and useful as they are, padlocks do not solve every situation requiring a lock and do not provide adequate protection from thieves skilled in the art of lock picking, or armed with bolt cutters. Part of the inherent weakness in these locks is the accessibility of the lock mechanism which is prone to removal by drilling, and the sliding staple which is exposed and conveniently held in position to allow cutters to be used. Whereas bank vaults, safes and lockbox mechanisms are often equipped with shields or other devices which cover the means for their removal, conventional locks do not have such features.

The instant invention lock system in each of its embodiments, seeks to address the inherent weaknesses in conventional locks by providing a number of features to make the locks widely adaptable to existing applications and to broaden those applications into areas hitherto beyond the scope of traditional locking methods. At the same time, providing locks which are innately more secure due to features which protect the method for their own removal.

SUMMARY OF THE INVENTION

It is therefore an object of the invention in each of its embodiments to provide a lock employing a stud or pin, threaded or unthreaded, internally or externally to which other objects which need to be locked can be attached and the stud or pin thereafter to be secured within a lock body.

It is a further object of the invention to construct the lock bodies and the pins or studs from suitably tough materials such as 304 stainless steel or other such materials suitable for each application.

A still further object of the invention is to provide in one of its embodiments, a lock which can be fitted to a jet ski personal water craft either before or after its manufacture, to facilitate locking the craft to a mooring or docking site with a cable/lock pin combination that is cosmetically appealing, effective and highly resistant to illicit removal.

A still further object of the invention is to provide in one of its embodiments, a lock which can be fitted to a boat or other trailer before or after its manufacture, to facilitate locking the trailer with a cable/lock pin combination that is cosmetically appealing, effective and highly resistant to illicit removal and prevents the trailer's removal while it is deployed.

It is a further object of the instant invention to provide the boat owner, homeowner, trucker, construction company for example with a means of securing an out board motor, stern drive, propeller, trucking container or perimeter gate for example, using a unique combination of simple components which, when used together provide a secure and tamper-proof attachment means.

It is a further object of the invention to provide a lock with a hidden internal moving cam system activated by a tumbler lock (which is revolved continuously around a 360 degree axis much the same as a ratchet wrench tightens a bolt) with the cam coming to rest in an annular recessed groove in the locking stud or pin thus preventing the separation of the stud or pin and the lock body.

It is a further object of the invention to provide a lock with an external moving cam system activated by a tumbler lock with the cam coming to rest in an annular recessed groove in the locking stud or pin thus preventing the separation of the stud or pin and the lock body.

The instant invention once assembled and installed, can only be removed with the correct key or by destroying the lock with appropriate shop tools, such as, for example, a diamond edged saw. By reason of its construction from 304 work-hardened stainless, and the fact that over 1.25 inches of the steel must be cut to effect its removal without a key and that the removal must be done using special mechanized cutting tools, the time thus involved is sufficient to deter a thief.

The instant invention in its cabled embodiments uses the same 304 stainless for its main components and very hard "kryptonite" flexible cable.

DESCRIPTION OF A FIRST EMBODIMENT

Figure 1:
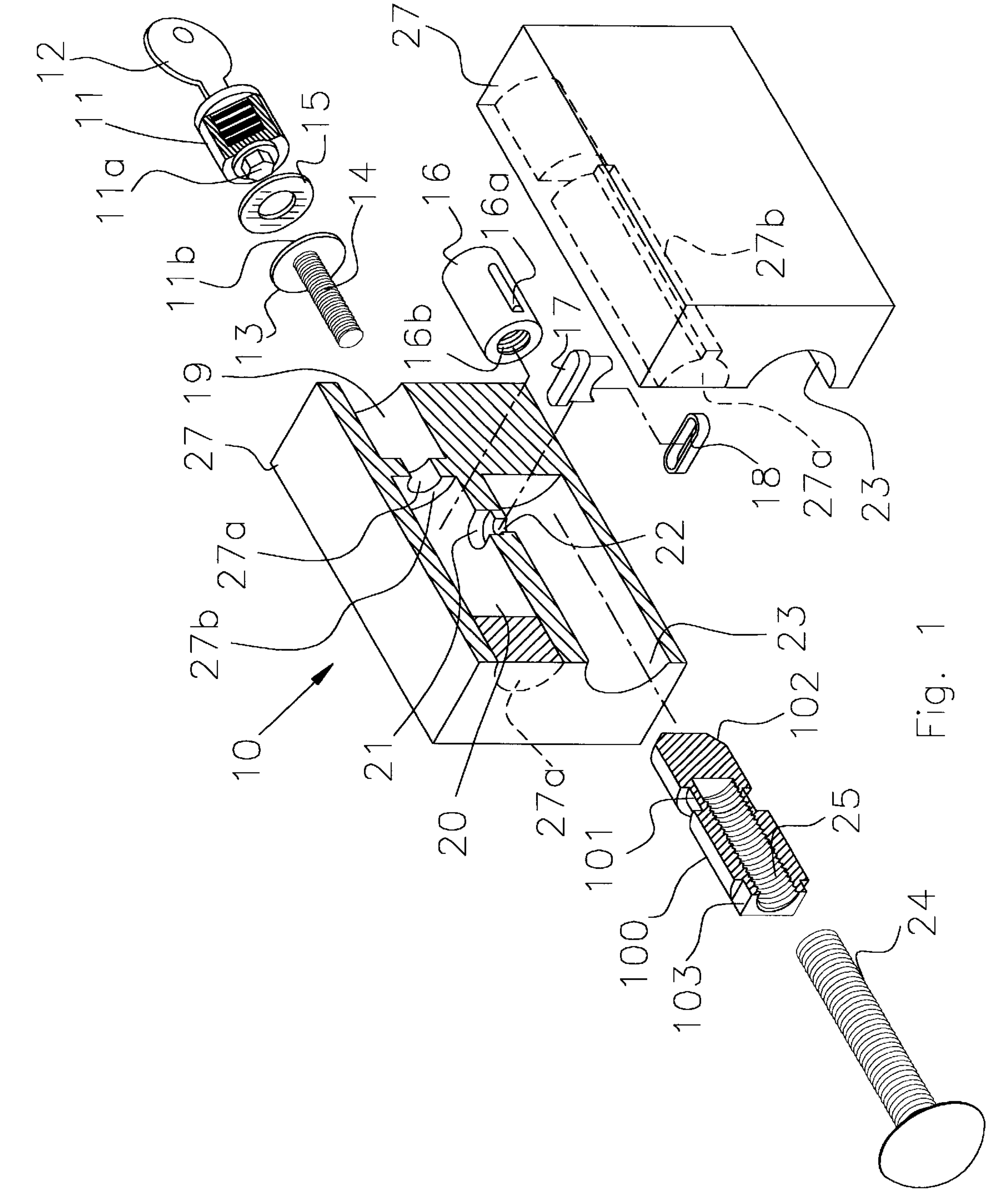
FIG. 1 is an exploded perspective view, partially in section of a first embodiment of the present invention as described herein.

Referring now to the drawings wherein like numerals designate like and corresponding parts throughout the several views, numerals 100, 101, 102 and 103 refer to a locking pin (100), the key common component of each of the embodiments of the present invention.

Referring now to FIG. 1 screw pin 24 attaches to thread 25 of locking pin 100 which is tightened in place using square section 103. Chamfer 102 facilitates entry of locking pin 100 into chamber 23 of body 27. When offered up to body 27, pin 100 aligns annular slot 101 beneath hole 22. In this position, sliding pin 17 can engage annular slot 101. Sliding pin 17 is held in an un-deployed position by flexible bumper support 18 until it is slideably pressed into an engaged position by tapered actuator 16. Actuator 16 is internally threaded 16*b* and engages thread 14 of bolt 13. Thread 14 enters through chamber 19 and protrudes through hole 27*a*. Once engaged with thread 16*a* of actuator 16, stop face 27*b* prevents the actuator 16/thread 14 assembly from being removed from chambers 19 and 20 respectively. Initial assembly of actuator and thread 14 is effected by access through the end of chamber 20 prior to its sealing by pressed fit seal 27*c*. Carbide washer 15 is interposed between lock assembly 11 and face 13 to prevent the removal of the lock assembly by drilling.

Figure 2:
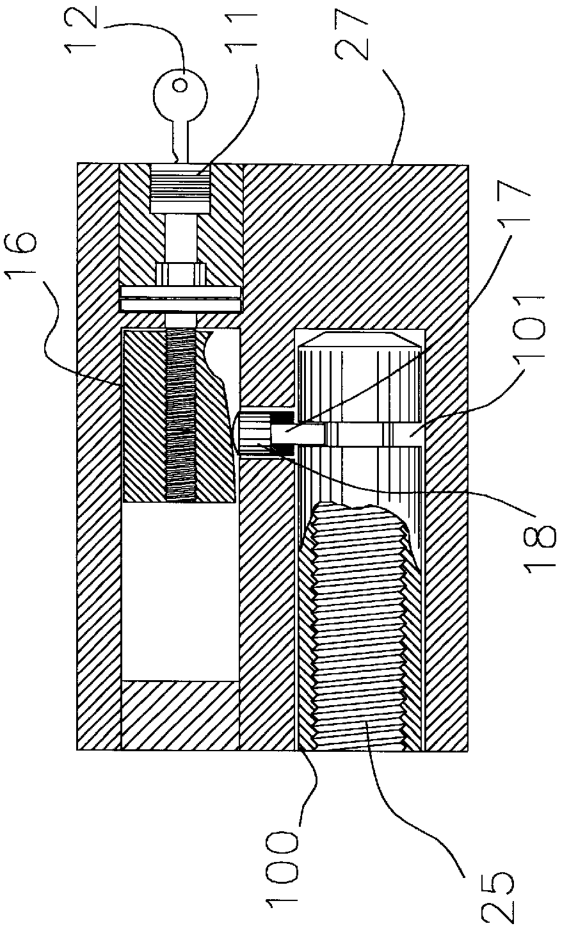
FIG. 2 is a side elevation partially in section of the first embodiment of the present invention.

In operation, bolt 24 is used to secure objects to be locked which are then attached to locking pin 100 as described above. Locking pin 100 is positioned within body 27 so as to align annular groove 101 beneath hole 22. Key 12 is used to turn wafer lock 11 (which permits continuous circular turns) hexagonal head 11*a* engages female hexagonal slot 11*b* and transmits the turning motion of key 12 to thread 14 causing actuator 16 to slide closer to stop 27*b*. This sliding motion causes the tapered lower surface (FIGS. 2, 2*b*) of actuator 16 to be forced against the top of sliding pin 17 forcing it down into slot 21 and hole 22 and compress ably against flexible bumper support 18. In this deployed position, sliding pin 17 now engages annular groove 101 preventing the extraction of pin 100 from body 27 thus effectuating the locking effect required.

Figure 2A:
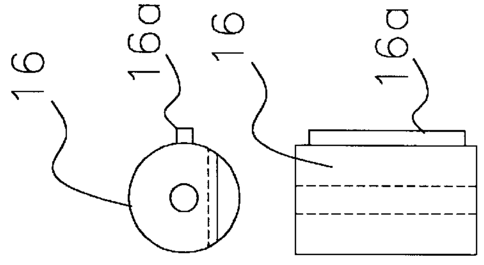
FIG. 2*a* is a top/side elevation of a sliding locking cam component of the first embodiment of the present invention.
Figure 2B:
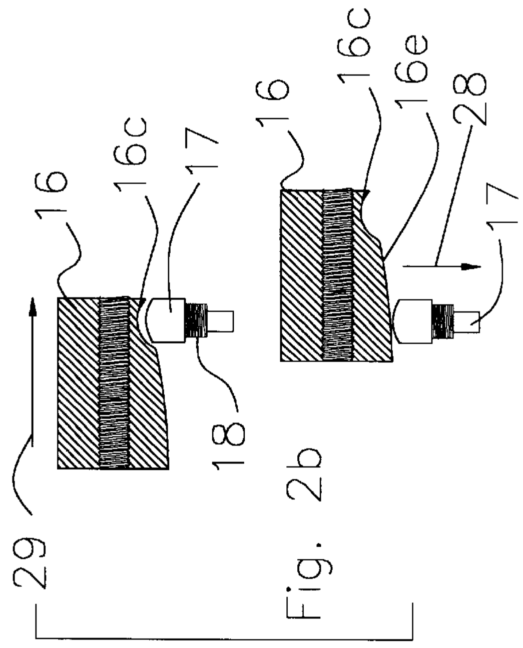
FIG. 2*b* is a side elevation partially in section of the sliding locking cam of the first embodiment of the present invention depicting said sliding locking cam in both its locked and unlocked positions.

Referring now to FIG. 2*a* in which the top and end views of actuator 16 are seen, raised key section 16*a* engages a longitudinal slot 27*b* (FIG. 1) to prevent unwanted rotation of actuator while key 12 is being turned.

Figure 3:
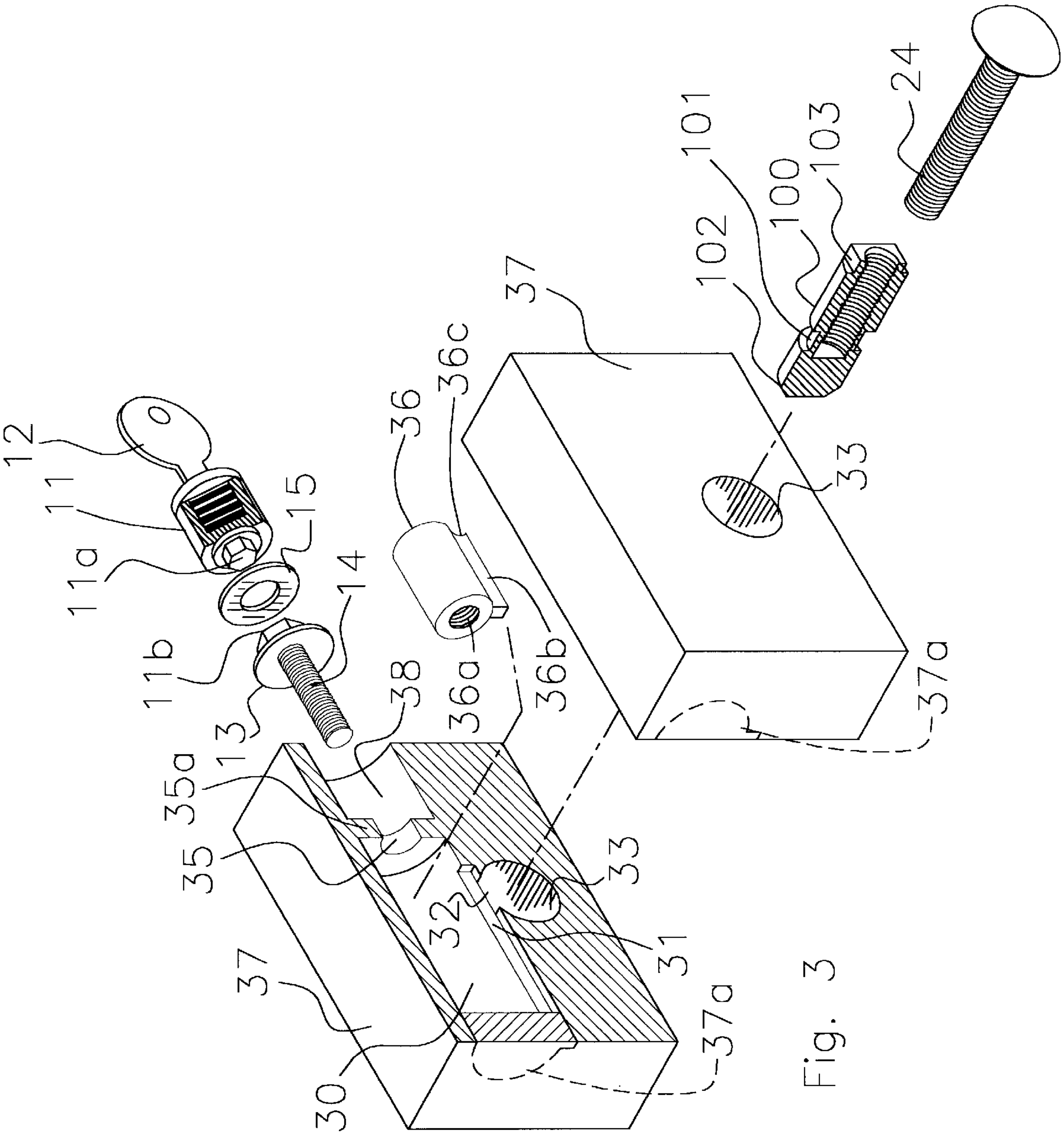
FIG. 3 is an exploded perspective view partially in section of a second embodiment of the present invention.
Figure 4:
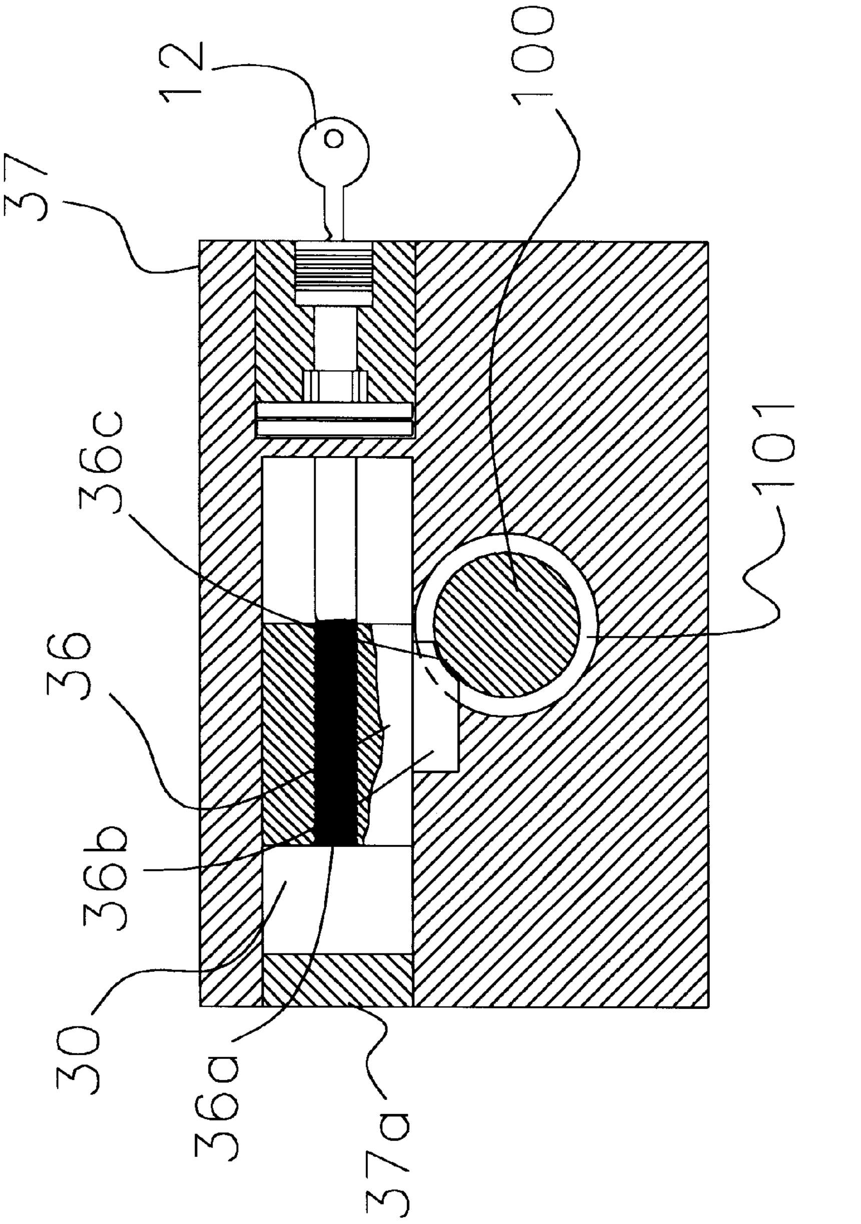
FIG. 4 is a side elevation partially in section of the second embodiment of the present invention.

Referring now to FIGS. 3 and 4 in which the locking mechanism is identical to that described above in FIGS. 1–2*b* save for entry hole 33 being perpendicularly positioned to the axis of lock body 37 instead of parallel to it and for the lack of a flexible bumper. In this embodiment, sliding key 36*b* of actuator 36 engages annular groove 101 in pin 100.

Figure 5:
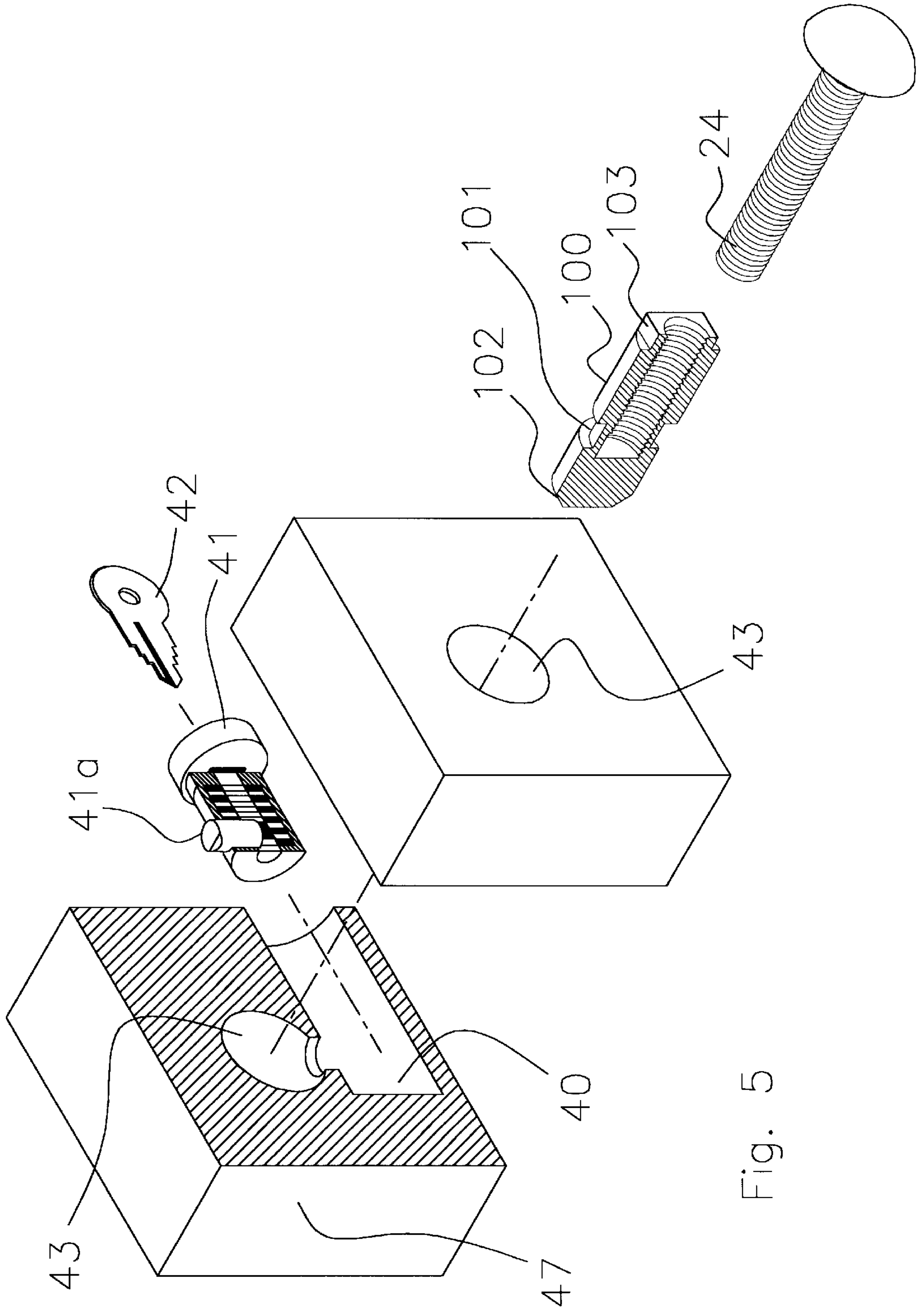
FIG. 5 is an exploded perspective view partially in section of a third embodiment of the present invention.

Referring now to FIG. 5 in which locking pin 100 and its component parts as described in earlier embodiments enter body 47 via hole 43. wafer lock assembly 41 is offered up to chamber 40. Key 42 turns so as to raise lock pin 41*a*. Lock pin 41*a* thus engages annular groove of pin 100 thus effectuating the locking effect required.

Figure 6:
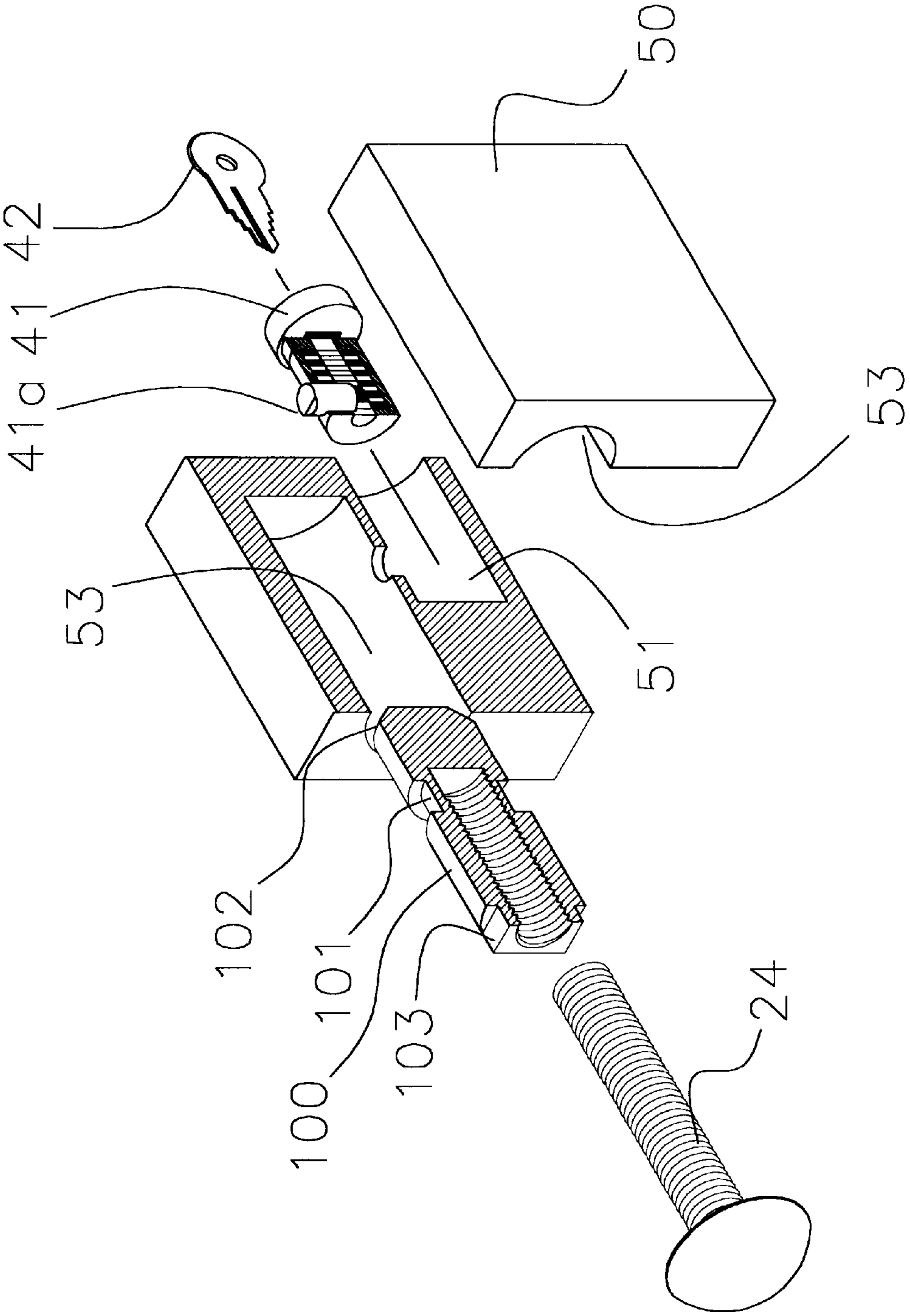
FIG. 6 is an exploded perspective view partially in section of a fourth embodiment of the present invention.

Referring now to FIG. 6 in which locking pin 100 and its component parts as described in earlier embodiments enter body 50 via hole 53. wafer lock assembly 41 is offered up to chamber 51. Key 42 turns so as to raise lock pin 41*a*. Lock pin 41*a* thus engages annular groove of pin 100 thus effectuating the locking effect required.

Figure 7:
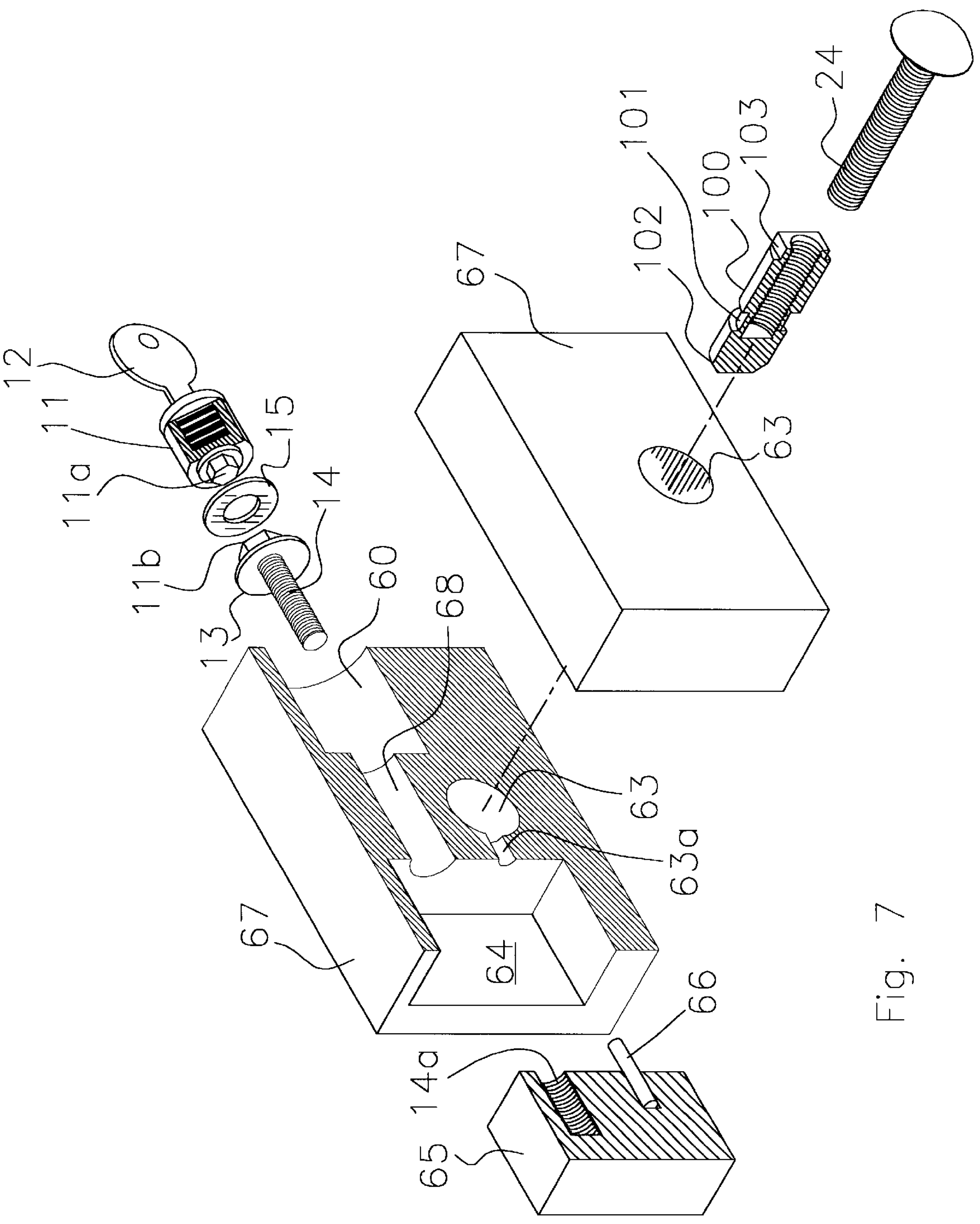
FIG. 7 is an exploded perspective view partially in section of a fifth embodiment of the present invention.
Figure 8:
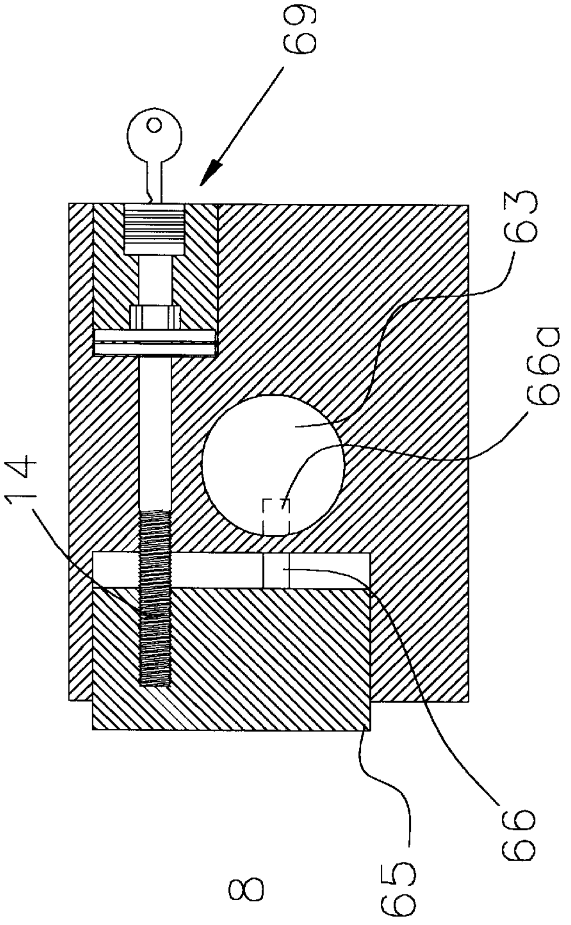
FIG. 8 is a side view partially in section of the sixth embodiment of the present invention showing an external cam locking mechanism in a pre-deployment position.
Figure 9:
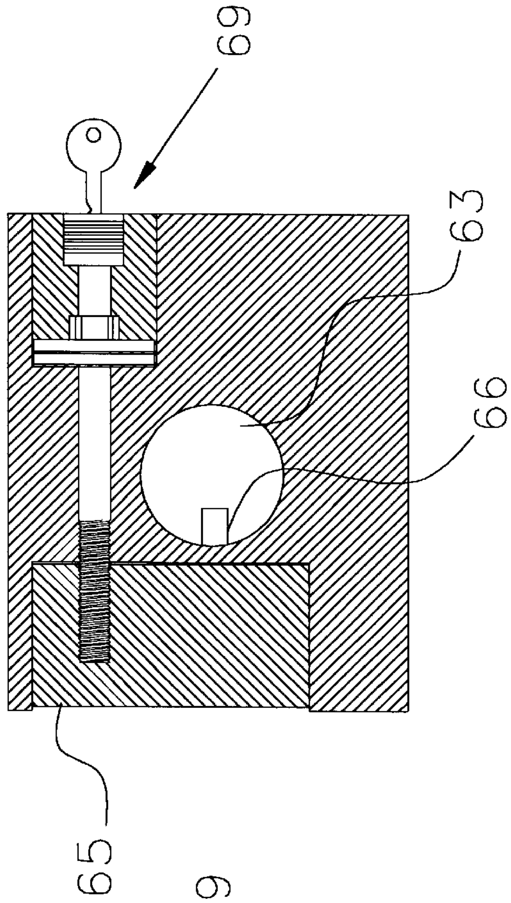
FIG. 9 is a side view partially in section of the sixth embodiment of the present invention showing an external cam locking mechanism in a deployed position.

Referring now to FIGS. 7, 8, 9 in which locking pin 100 and its component parts as described in earlier embodiments enter body 67 through hole 63. The key/wafer lock assembly is as described in FIG. 1 (Carbide washer 15 is interposed between lock assembly 11 and face 13 to prevent the removal of the lock assembly by drilling.) In this embodiment, thread 14 engages internal thread 14*a* inside external cam 65. When key 12 is turned, thread 14 pulls cam 65 into body 67 and space 64 such that sliding pin 66 engages annular slot 101 in locking pin 100 thus effectuating the locking effect required.

Figure 10:
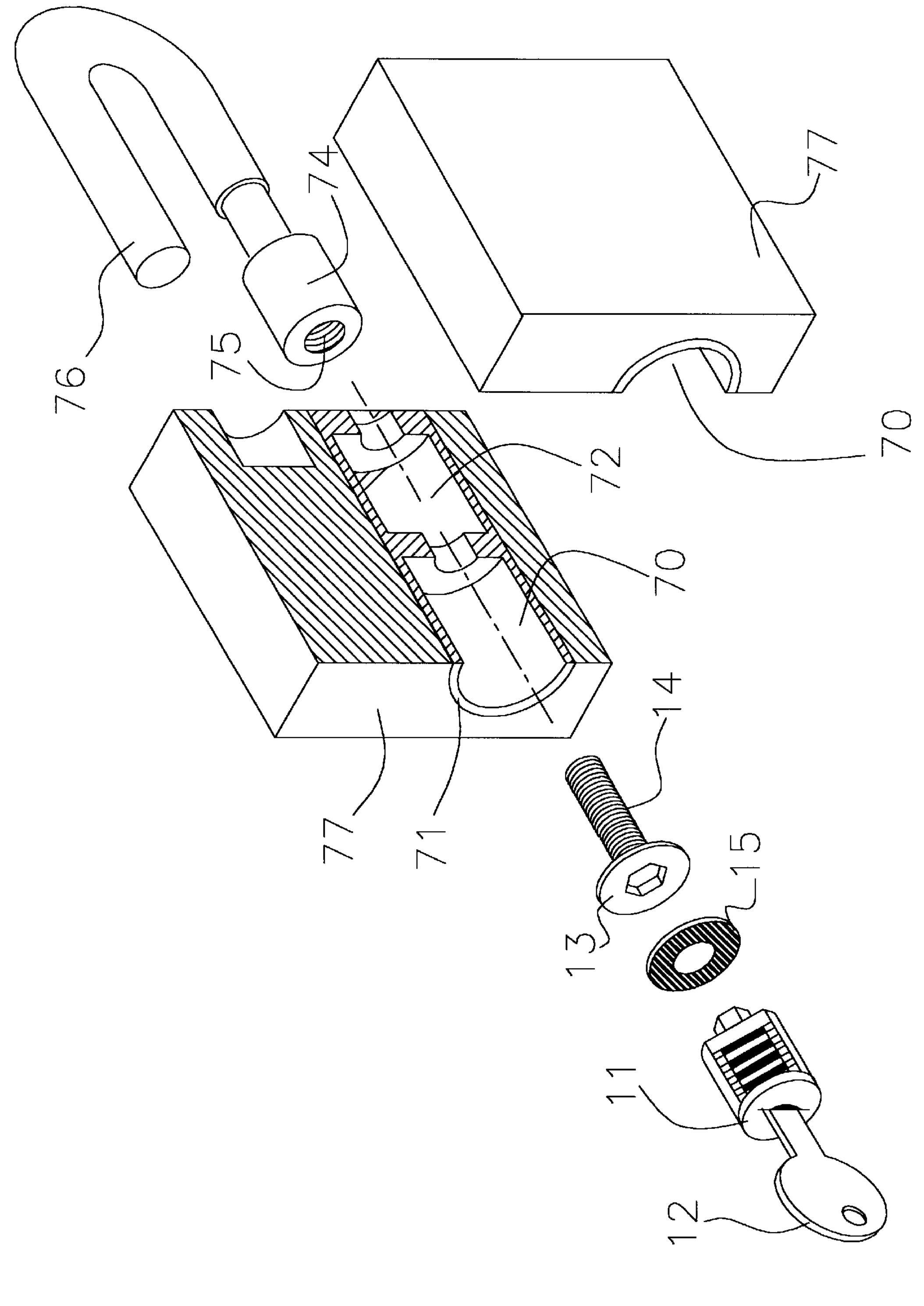
FIG. 10 is an exploded perspective view partially in section of a seventh embodiment of the present invention.
Figure 11:
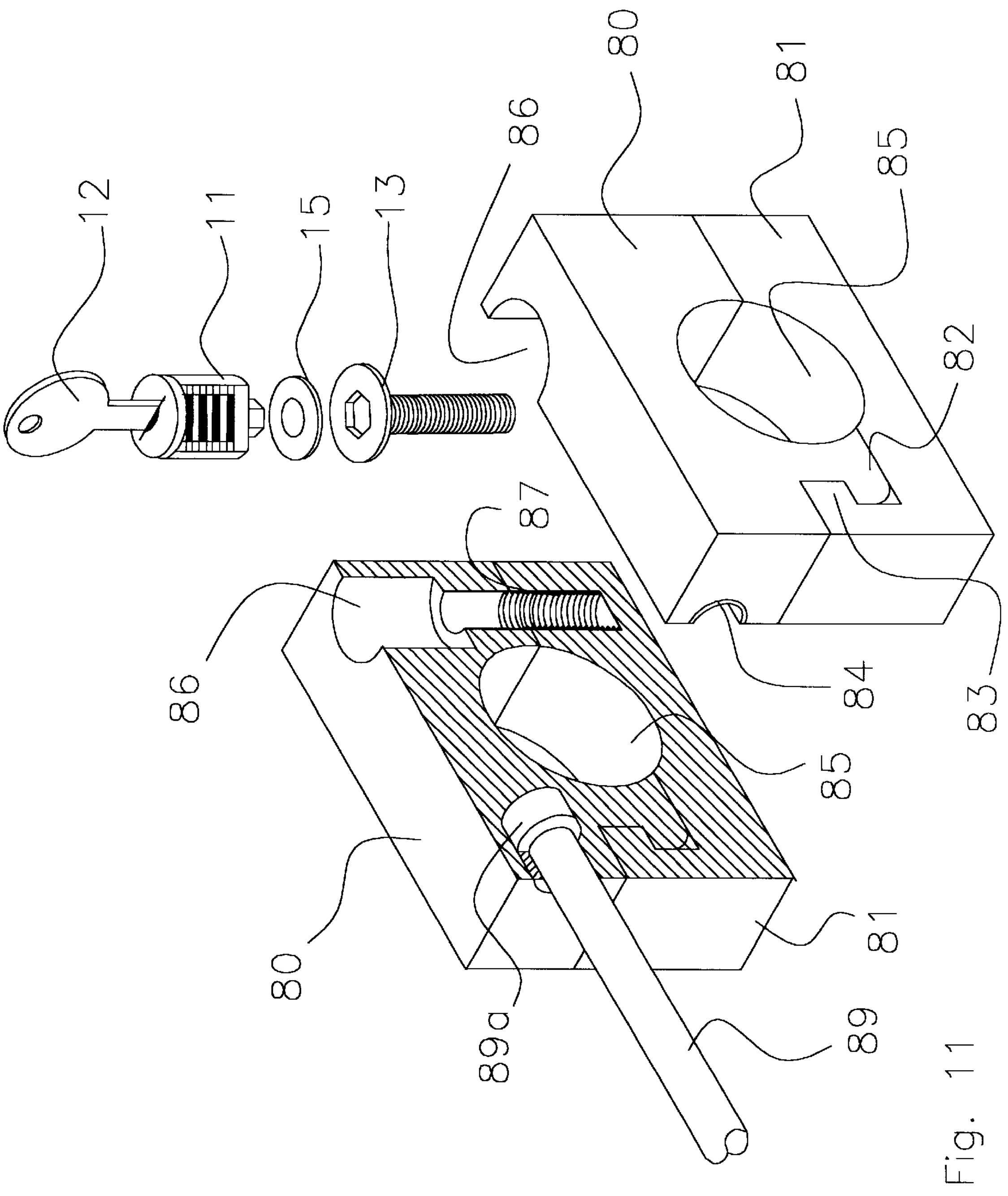
FIG. 11 is an exploded perspective view partially in section of an eighth embodiment of the present invention.
Figure 12:
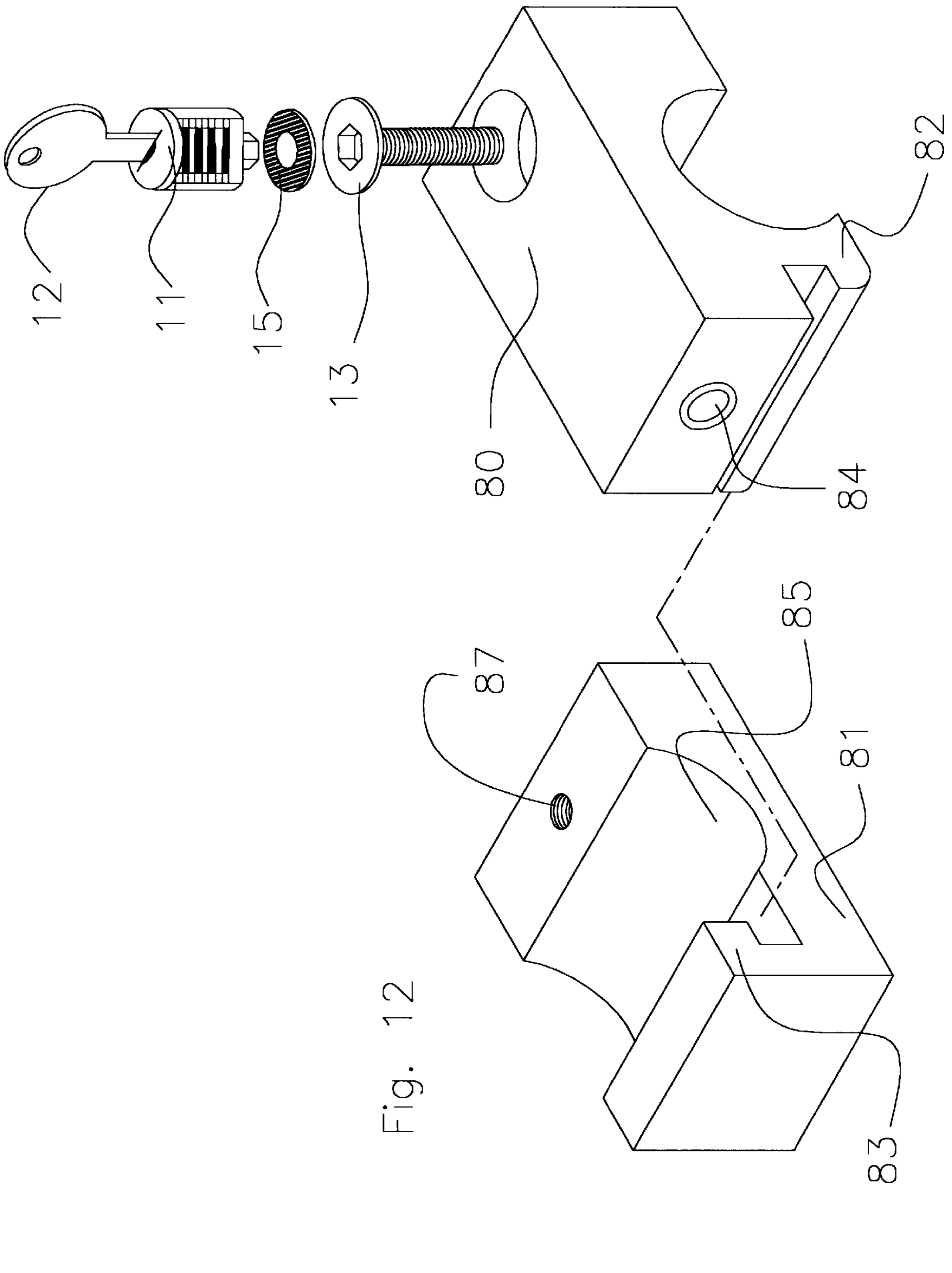
FIG. 12 is an exploded perspective view of the eighth embodiment of the present invention.

Referring now to FIG. 10 which acts similarly to a conventional padlock having a sliding staple 76 with internally threaded boss 74. The key/wafer lock assembly is as described in FIG. 1 (Carbide washer 15 is interposed between lock assembly 11 and face 13 to prevent the removal of the lock assembly by drilling.) In this embodiment, thread 14 engages internal thread 75 inside internally threaded boss 74. When key 12 is turned, thread 14 pulls internally threaded boss 74 into body 77 thus effectuating the locking effect required. In its construction, FIG. 10 comprises body 77 and insert 71 a double chambered (70, 72) component machined longitudinally and then split diametrically to permit the fitting of boss 74 into chamber 72. The insert 71 is thereafter pressed permanently in place. Carbide washer 15 is interposed between lock assembly 11 and face 13 to prevent the removal of the lock assembly by drilling Referring now to FIG. 11 in which body 80 is comprised of two interlocking parts, 80 and 81. Interlocking components 82 and 83 permit the separation of 80 and 81 (FIG. 12) The key/wafer lock assembly is as described in FIG. 1 (Carbide washer 15 is interposed between lock assembly 11 and face 13 to prevent the removal of the lock assembly by drilling.) Upper and lower body parts 80 and 81 are effectively a clamp fixed at one end by interlocking parts 82 and 83 and locked and unlocked by the key/wafer lock assembly. (Carbide washer 15 is interposed between lock assembly 11 and face 13 to prevent the removal of the lock assembly by drilling) In operation, 80 and 81 can be hinged apart to permit an item to be locked, an automobile steering wheel for example, to be offered up to opening 85. Body parts 80 and 81 can thereafter close together around the component to be locked whereupon the key/wafer lock assembly is inserted into access hole 86 and threaded hole 87 and tightened. Flexible cable 89 is secured within upper body 80 by collar 84 and head 89*a*. Cable 89 is permanently and securely mounted within the vehicle by attachment to the floor or other convenient location.

Figure 13:
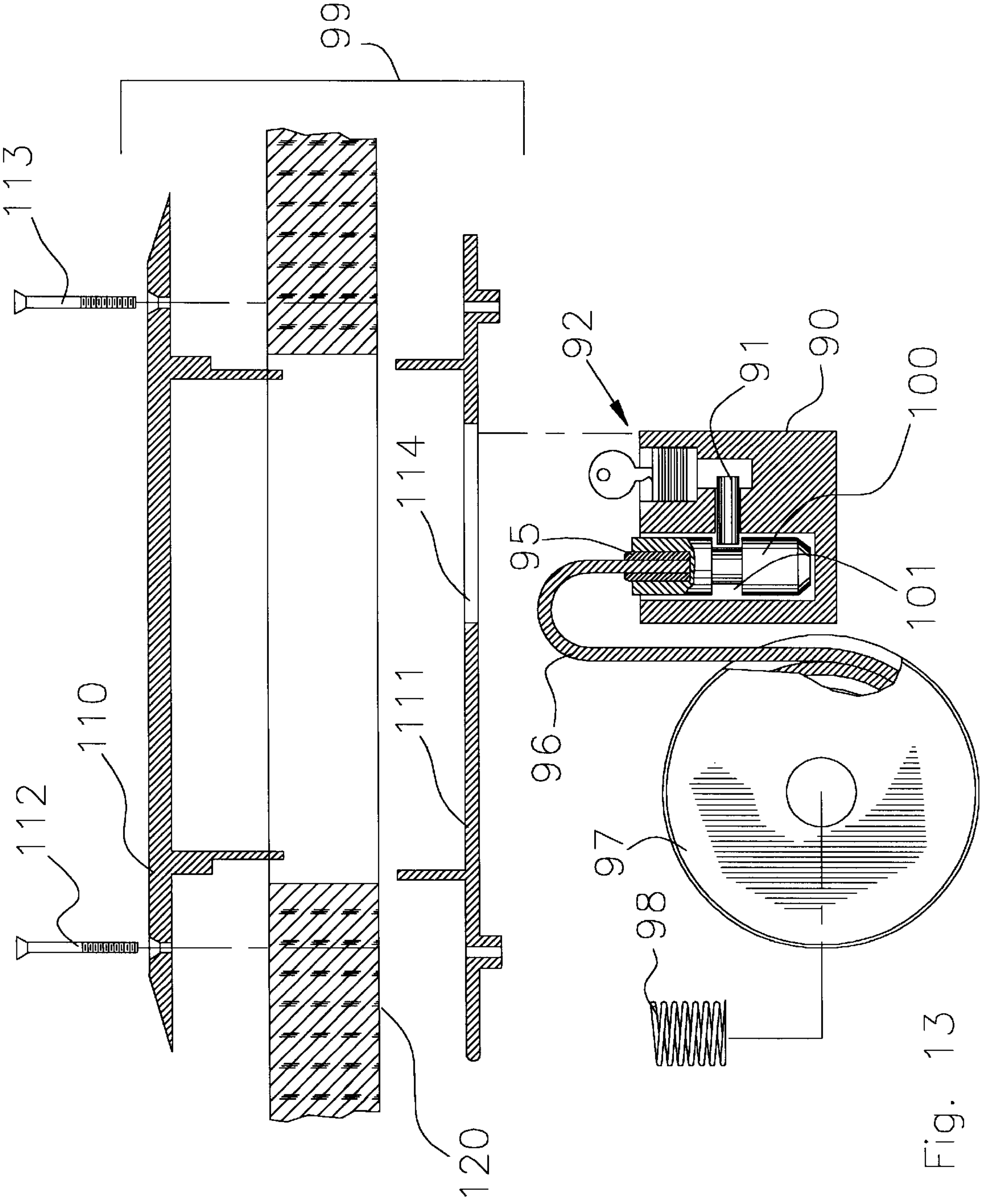
FIG. 13 is an exploded side view partially in section of a ninth embodiment of the present invention.

Referring now to FIG. 13, locking pin 100 and its components as described above in other embodiments is held within body 90 by pin 91 which is actuated and positioned by key and wafer lock assembly 92. Flexible hardened cable 96 is swaged 95 proximally into pin 100 and attached distally to spring 98 tensioned spool 97. Attachment means 99 comprising one-way screws 112, 113 and plates 110 and

111 which sandwich bulkhead, hull, frame or other base 120 to permit lock body 90 and its component parts to be securely attached. In operation, supposing that 120 is a bulkhead of a water craft for example, key assembly 92 would be turned to release pin 91 from annular slot 101 such that pin 100 and thus cable 96 were able to be passed through aperture 114 out and around a fixed mooring (not shown) and back into body 90 whereupon pin 91 could be re-deployed to secure pin 100 and cable 96 in place within the body of the craft. Spool 97 would serve the dual functions of acting to tension cable 96 and to secure cable at its distal end against unauthorized removal thus effectuating the locking effect required. This embodiment of the present invention lends itself to broad diversification whereby any suitable bulkhead or frame could serve as the base for the lock/cable combination.

Figure 14:
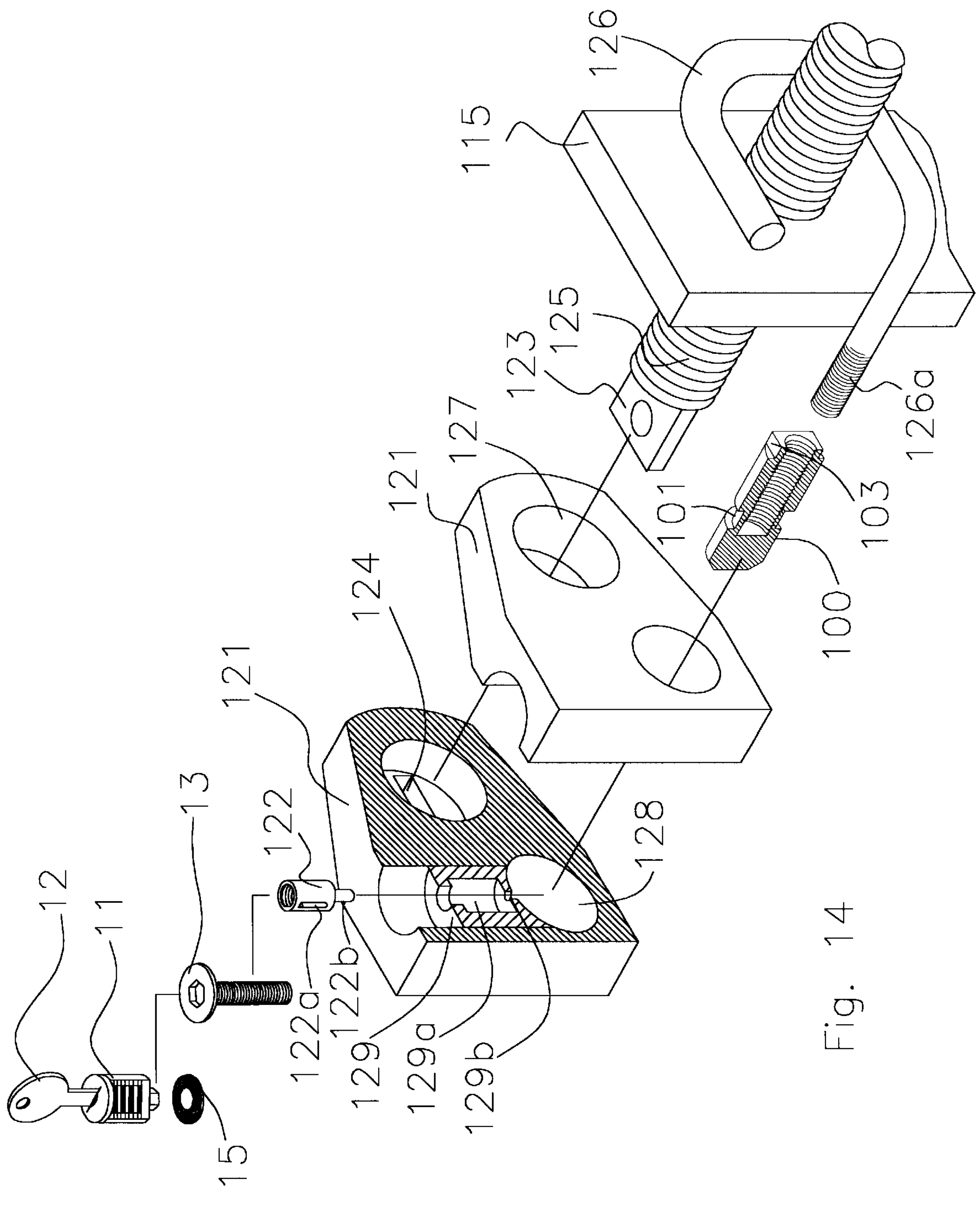
FIG. 14 is an exploded perspective view of a tenth embodiment of the present invention.
Figure 15:
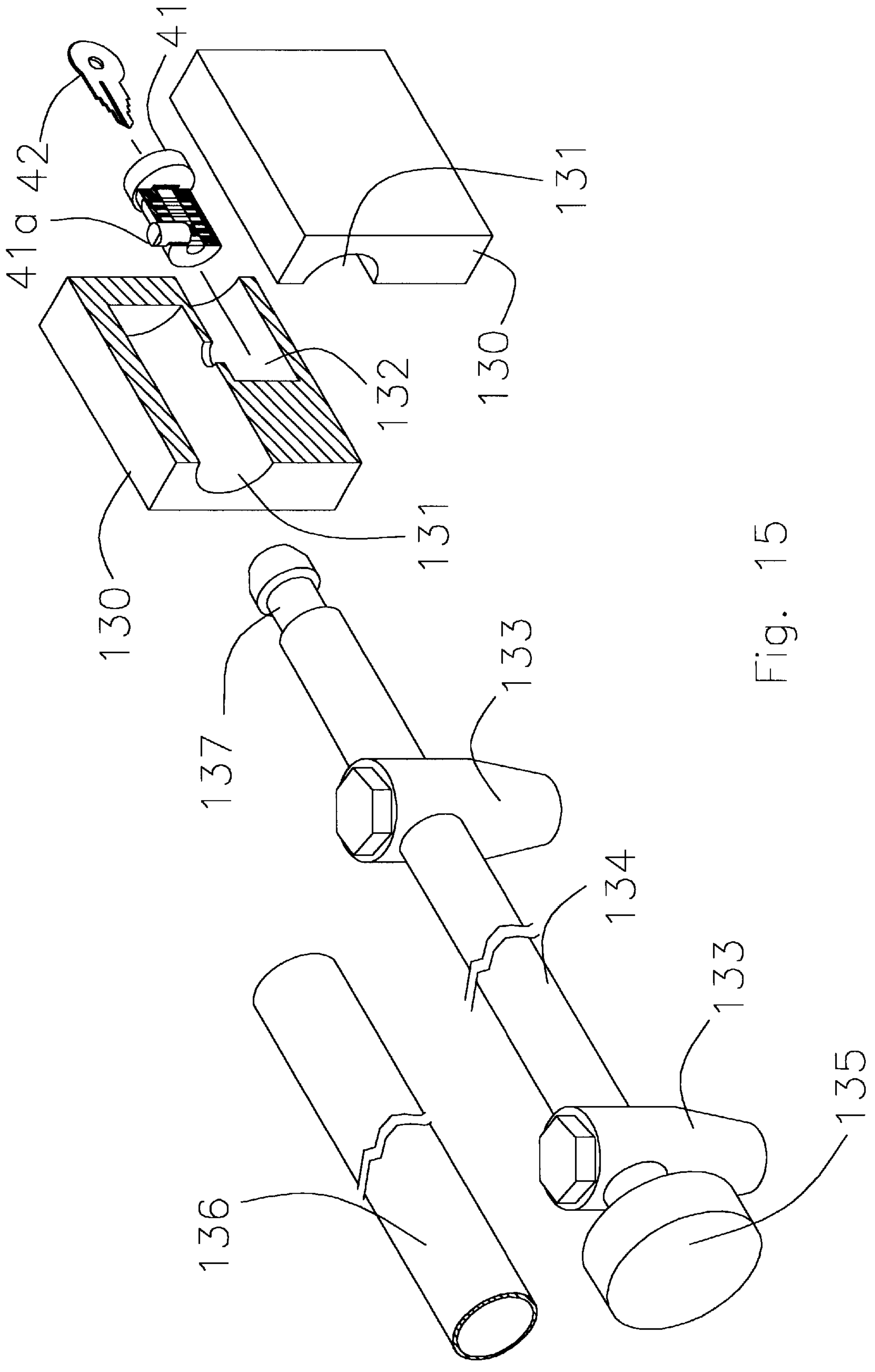
FIG. 15 is an exploded perspective view of and eleventh embodiment of the present invention.

Referring now to FIG. 14 in which lock pin 100 and its component parts as described above is threaded onto hooked rod 126 at thread 126*a*. Hooked rod 126 loops up and around outboard motor mounting arm 125 and abuts plate 115 (through which 125 passes). Slotted end 123 of mounting arm 125 is offered up to slot 124 in lock body 121 and lock pin 100 is offered up into hole 128 where it is locked in place by lock pin 122*b*. Lock pin 122 is activated by turning key 12 as described in the earlier embodiments. Once locked in place, hooked rod 126 cannot be longitudinally removed as it is retained at its proximal end by lock body 121 and at its distal end by plate 115 and cannot be rotationally removed because hooked rod 126 interferes with plate 115 and cannot be fully rotated. (Alternatively, mounting arm 125 can be constructed with a threaded end at 123 which threads into lock body 121 at hole 127 instead of into slot 124) Referring now to FIG. 15 in which lock body 131 and wafer lock/key assembly 41 as described in earlier embodiments attaches distally to rod 134. Rod 134 passes through outboard motor or stern drive lock nuts 133 and is retained proximally by head 135 and distally by lock 130. Sleeve 136 is rotatably attached along the longitudinal axis of rod 134 during assembly prior to the fitting of a second lock nut 133. Once both lock nuts 133 and lock 130 are in place, rod 134 cannot be removed without releasing lock 130. As lock nuts 133 are secured in place upon a stem drive or outboard motor mounting stud and by rod 134 as described, neither can be rotationally removed thus effectuating the locking effect required. Stainless steel sleeve 136 prevents the unauthorized removal of rod 134 by cutting as it spins against any effort to cut it with a blade and so prevents its own removal.

What is claimed is:

1. A locking device for securing outboard motors and stem drives mounted on a plurality of exposed studs on the stem of a boat, and construction equipment on a plurality of exposed studs inset in concrete and other items which can be mounted with exposed studs, shafts or other protuberances upon which said locking device can be mounted, said device consisting of:

a stainless steel lock nut having a blind hole therein along a center line of said lock nut, parallel to a center line drawn through said lock nut, a first end having a plurality of flat surfaces for gripping and turning said lock nut, and a circular groove formed around the periphery of said lock nut, a lock body having a first end and a second end, said lock body having a first blind hole formed through said first end and a second blind hole formed from said second end, below said first blind hole and a connecting slot formed between said first and second blind holes, a dividing partition located between a first section of said first blind hole and a second section of said first blind hole, said partition having a connecting hole of reduced diameter formed parallel to a center line drawn through said first blind hole, a keyway formed parallel to a center line drawn through said first section of said blind hole, a lock assembly having a lock catch slideably inserted through a flexibly collapsible support means into said connecting slot, a slideably inserted compression means within said first section of said first blind hole, said compression means having a first end and a second end and a key protrusion from its outer surface parallel to a center line drawn through said compression means, and a threaded blind hole formed in the said first end of said compression means, and a tapered face along the lower edge parallel to a center line drawn through said compression means, said tapered face having a first narrow surface and a second broad surface, an externally threaded bolt having a first end and a second end and a female attachment means formed within said second end, a keyed lock assembly having a first end and a second end, said first end having a male attachment means and said second end having a key hole, a circular washer interposed between said second end of said threaded bolt and said first end of said keyed lock assembly, said washer being formed from a hard substance, whereby said externally threaded bolt protrudes through said connecting hole between said first and said second blind holes and engages said internal thread inside said compression means, whereby said keyed lock assembly rotatably engages said threaded bolt and thereby slideably adjusts said compression means, said compression means having engaged said keyway in said first blind hole, said compression means being thereby prevented from rotating around said center line of said compression means, whereby said tapered surface on said compression means is moved parallel to a center line drawn through said compression means and said second blind hole, thereby forcing said lock catch down into said connecting slot between said first and second blind holes, and whereby said flexibly collapsible support means allows said lock catch to engage said circular groove and thereby grip said lock pin in a locked position.

* * * * *